April 14, 1925.

L. P. FEUSTMAN

INTERNAL COMBUSTION ENGINE

Filed June 4, 1920

1,533,642

Inventor
Leon P. Feustman
By his Attorneys

Patented Apr. 14, 1925.

1,533,642

UNITED STATES PATENT OFFICE.

LEON P. FEUSTMAN, OF HARRISON, NEW YORK, ASSIGNOR TO WORTHINGTON PUMP AND MACHINERY CORPORATION, OF NEW YORK, N. Y., A CORPORATION OF VIRGINIA.

INTERNAL-COMBUSTION ENGINE.

Application filed June 4, 1920. Serial No. 386,535.

*To all whom it may concern:*

Be it known that I, LEON P. FEUSTMAN, a citizen of the United States, residing at Harrison, county of Westchester, and State of New York, have invented certain new and useful Improvements in Internal-Combustion Engines, fully described and represented in the following specification and the accompanying drawings, forming a part of the same.

This invention relates to the feeding and vaporization or gasification of fuel in internal combustion engines, and is particularly applicable to that class of engines operating on the Diesel or constant pressure system.

The especial object of the invention is to provide an apparatus and method employing solid injection of the oil or other liquid or solid fuel, as distinguished from spraying the fluid by compressed air, by which the proper feed of the fuel to the cylinder for securing the maximum power and economy may be attained. The specific means used for this purpose falls within the class of fuel supply by which a partial combustion is followed by a gradual feed of the fuel to the cylinder combustion space as the piston moves outward, and I aim particularly to control the time, rate and amount of partial combustion and the character and rate of fuel distribution through the cylinder combustion space, so as to secure the results desired.

The oil is injected during compression, and preferably near the end of the compression stroke, into a chamber opening into the cylinder, and this chamber is partially closed to the cylinder combustion space by a fuel guard on the piston at the time of injection, so as to restrict the amount of contact between the fuel and air at the time of injection and vaporization or gasification, and thus secure a limited combustion, this fuel guard being such as to provide restricted openings between the fuel injection passage and cylinder combustion space, so as to secure a gradual flow of fuel to the cylinder and its distribution through the cylinder combustion space. The oil is vaporized or gasified by being injected into the air in the chamber which has been compressed to ignition temperature at the time of injection and preferably against the hot fuel guard on the piston, and the construction is such as to secure the combustion required to maintain the fuel guard at the required high temperature for ignition and combustion. The cylinder and injection chamber walls are not relied on for vaporization and gasification of the fuel, and are not intended to be heated and preferably are cooled by the usual jacket. As the piston moves outward, the injection chamber is fully opened after the completion of the fuel feed, and proper scavenging thus secured, there preferably being no restriction of the opening from the chamber into the cylinder except the temporary restriction formed by the piston.

For a full understanding of the invention, a detailed description of constructions embodying and for carrying out the invention in the best form now known to me, will now be given in connection with the accompanying drawings forming a part of this specification, and the features forming the invention then specifically pointed out in the claims.

Figure 1:
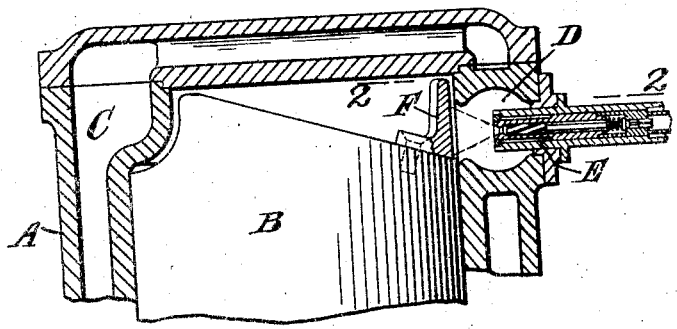
Figure 1 is a central section through the cylinder head, piston fuel guard and oil injection nozzle, showing the piston in elevation, the engine being shown as of the two-cycle type.
Figure 2:
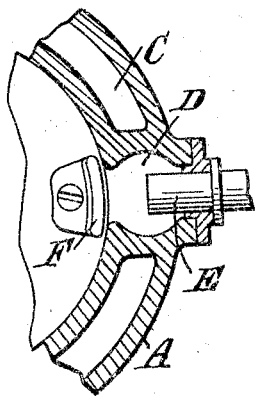
Figure 2 is a cross-section on the line 2—2 of Fig. 1.

Referring to the drawings, and now particularly to Figs. 1 and 2, A is the engine cylinder; B the piston; C the cooling or water jacket; D the injection chamber, and E the oil injection nozzle, through which the oil is forced in through a suitable pump, this oil injection nozzle being shown as of a well-known type adapted to deliver the oil in a cone spray at a suitable angle, but it will be understood any other form of nozzle securing similar results may be used.

The chamber D to which the injection nozzle E delivers, is open freely to the cylinder combustion space, except as it is partially closed by piston fuel guard F during the latter part of the compression stroke and the first part of the working stroke. This fuel guard F may be formed in any suitable manner and integral with the piston, if desired, but is shown as a flange secured to the top of the piston, and of such width and height as to overlap and cover the injection chamber D. The fuel guard F is so formed and placed on the piston, however, that narrow spaces at the sides and top of the projection connect the injection chamber D with the cylinder combustion space, and these narrow passages permit a gradual flow of vaporized or gasified fuel and air to the cylinder combustion space. If desired, the fuel guard may be perforated for a restricted flow through the guard.

It is intended that the combustion shall be definitely limited by the size of the injection chamber, and the piston fuel guard be of such form and the extent of its metal connection with the piston such, that the outer wall of the fuel guard is kept hot and prompt and full ignition and combustion started before or on the stoppage, and maintained after the reversal, of the piston.

The operation of the construction is as follows: The oil is injected through nozzle E in a conical spray and is vaporized or gasified as it comes into contact with the compressed air in the chamber D and strikes the hot wall of fuel guard F and partial combustion follows. The injection occurs after the air has been compressed to ignition temperature and preferably just before the end of the compression stroke. It should not occur or continue after dead center. The fuel guard F forms a baffle to restrict the degree of contact between the fuel and air at the time of injection so as to properly limit the preliminary combustion. Air preferably is flowing from the cylinder at the time of injection, and this, with the partial combustion of the fuel, increases the pressure of the vaporized or gasified or partially vaporized or gasified fuel in the chamber, so that at the moment of reversal there will be a flow of fuel around the fuel guard F into the cylinder combustion space, and the limited combustion will sustain the pressure and maintain a vigorous flow toward the piston, as the piston moves outward, until all the fuel has been fed and gradually consumed. Thus, instead of a violent explosion or sudden pressure rise, there will be a slow rise of pressure, if the injection occurs sufficiently before dead center, producing and maintaining a flow of fuel to the combustion space in the cylinder as the piston moves outward, and thus securing the graduated feed of fuel that is desired for producing a combustion that will be sustained for a considerable time with constant pressure, in spite of the fact that the fuel pump may have injected all of the fuel into the chamber instantaneously. If the injection takes place later, there may be no rise of pressure, but the required relative pressures for fuel feed will be secured by the outward movement of the piston coacting with the combustion in the injection chamber to sustain the relative pressure therein, and thus substantially the same results be secured as with a rise of pressure on earlier injection. In either case, the small air contact secures a slow action and limited combustion, so that the main combustion is retarded and does not take place until expansion is begun on the reversal of the piston. As the piston moves out and the combustion space increases, the vapor and air expand and the vapor is fed out of the chamber gradually with the outward movement of the piston. The fuel guard preferably overlaps the opening from the injection chamber so as to provide only the narrow passages above and at the sides of the guard during a considerable portion of the early part of the outward stroke, thus securing a rapid stream into the cylinder which violently encounters the air in the cylinder and promotes good and complete combustion. This rapid flow decreases as the opening is uncovered by the piston guard, and as the piston moves outward farther the piston guard F uncovers the opening from the injection chamber fully, so that a free flow of air to and from the injection chamber is secured for scavenging.

The construction will cooperate well with a timed pump, so that the timing of the latter need not be exact, but inaccuracies of pump timing will be compensated for, and a less delicate and troublesome pump apparatus may be used.

The invention is illustrated in Fig. 1 with a single oil injection, and in connection with a two-cycle engine. The invention is equally applicable, however, to engines operating on other cycles, and in many cases important effects in respect to effective power and low fuel economy are secured by a plurality of injection chambers, each with its oil injection nozzle.

Figure 3:
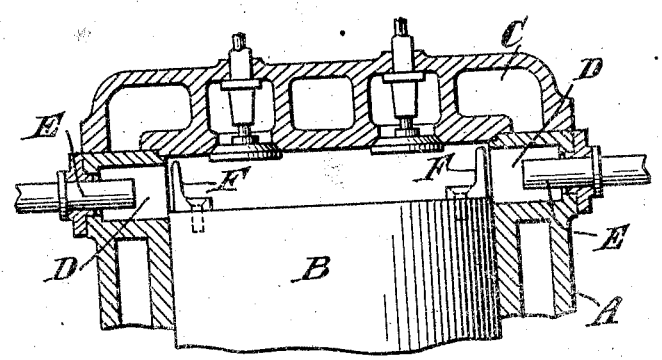
Figure 3 is a view similar to Fig. 1, showing two oil injections, the engine being shown as of the four-cycle type.

In Fig. 3 I have shown such a construction with two injection chambers and nozzles as applied to a four-cycle engine, and it will be understood that any number of such injection nozzles and chambers, arranged so as to secure the desired distribution of the fuel throughout the cylinder space, may be used. This plurality of oil injection nozzles may be found especially important in larger engines.

It will be understood, also, that the invention is not to be limited to the specific form of devices shown, but many modifications may be made in the invention by those skilled in the art while retaining the invention defined by the claims.

What is claimed is:

1. The method of feeding liquid or solid fuel to an internal combustion engine cylinder, which consists in compressing air in the engine cylinder and in a precombustion chamber having an opening into the cylinder restricted during the latter part of the compression stroke and early part of the working stroke by a guard on the piston, injecting fuel during or about the end of compression into the precombustion chamber and securing limited combustion, feeding the fuel to the cylinder from the precombustion chamber through the guard-restricted opening by the relative pressure in the precombustion chamber and cylinder, and gradually removing said restriction by the withdrawal of the guard on the outward stroke of the piston.

2. The method of feeding liquid or solid fuel to an internal combustion engine cylinder, which consists in compressing air in the engine cylinder and in a precombustion chamber having an opening into the cylinder restricted during the latter part of the compression stroke and early part of the working stroke by a guard on the piston, injecting fuel during or about the end of compression against the outer side of the guard and securing limited combustion, feeding the fuel to the cylinder from the precombustion chamber through the guard-restricted opening by the relative pressure in the precombustion chamber and cylinder, and gradually removing said restriction by the withdrawal of the guard on the outward stroke of the piston.

3. In an internal combustion engine, the combination with a precombustion chamber having an opening connecting with the side of the cylinder, of a fuel guard carried by the piston and moved by the piston across said opening to cover and uncover said opening, the fuel guard and opening being arranged to form a restricted passage to the cylinder during the latter part of the compression stroke and early part of the working stroke, and to uncover the opening for free connection to the cylinder during the remainder of the stroke, and means for injecting liquid or solid fuel into the precombustion chamber during or about the end of compression.

4. In an internal combustion engine, the combination with a precombustion chamber having an opening connecting with the side of the cylinder, of a fuel guard carried by the piston and moved by the piston across said opening to cover and uncover said opening, the fuel guard and opening being arranged to form a restricted passage to the cylinder during the latter part of the compression stroke and early part of the working stroke, and to uncover the opening for free connection to the cylinder during the remainder of the stroke, and means for injecting liquid or solid fuel into the precombustion chamber and against the fuel guard during or about the end of compression to secure partial vaporization or gasification and combustion.

In testimony whereof, I have hereunto set my hand.

LEON P. FEUSTMAN.